United States Patent
Li

(10) Patent No.: US 10,954,390 B2
(45) Date of Patent: Mar. 23, 2021

(54) SMART RUTTING AND CRACKING RESISTANT ASPHALT PAVEMENT INCORPORATING SHAPE MEMORY POLYMERS

(71) Applicant: Guoqiang Li, Baton Rouge, LA (US)

(72) Inventor: Guoqiang Li, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 98 days.

(21) Appl. No.: 16/299,223

(22) Filed: Mar. 12, 2019

(65) Prior Publication Data

US 2019/0284396 A1 Sep. 19, 2019

Related U.S. Application Data

(60) Provisional application No. 62/642,108, filed on Mar. 13, 2018.

(51) Int. Cl.
*C08L 95/00* (2006.01)
*E01C 7/26* (2006.01)

(52) U.S. Cl.
CPC ............... *C08L 95/00* (2013.01); *E01C 7/26* (2013.01); *C08L 2555/84* (2013.01); *C08L 2555/86* (2013.01)

(58) Field of Classification Search
CPC .. C08L 95/00; C08L 2555/84; C08L 2555/86; E01C 7/26
USPC .......................................................... 524/69
See application file for complete search history.

(56) References Cited

U.S. PATENT DOCUMENTS

2016/0272816 A1* 9/2016 Li ....................... C08F 299/024

OTHER PUBLICATIONS

Polacco et al., European Polymer Journal, 41, 2831-2844, 2005. (Year: 2005).*
T. Chung, A. Romo-Uribe, P.T. Mather. Two-way reversible shape memory in a semicrystalline network. Macromolecules, vol. 41, pp. 184-192, (2008).
P. Zhang and G. Li. Structural Relaxation Behavior of Strain Hardened Shape Memory Polymer Fibers for Self-Healing Applications. Journal of Polymer Science Part B: Polymer Physics, vol. 51, No. 12, pp. 966-977, (2013).
S. Hu, F. Zhou, and T. Scullion. Development, calibration, and validation of a new M-E rutting model for HMA overlay design and analysis. ASCE Journal of Materials in Civil Engineering, vol. 23, pp. 89-99, (2011).
B. Huang, G. Li, and L. N. Mohammad. Analytical Modeling and Experimental Study of Tensile Strength of Asphalt Concrete Composite at Low Temperatures. Composites Part B: Engineering, vol. 34, No. 8, pp. 705-714, (Dec. 2003).
L. Lu et al., "Giant reversible elongation upon cooling and contraction upon heating for a crosslinked cis poly(1,4-butadiene) system at temperatures below zero Celsius," *Scientific Reports* (2018) 8:14233.
G. Li, Y. Zhao, and S.S. Pang. Micromechanical Modeling of Polymer Modified Asphalt at Low Temperatures. Journal of Elastomers and Plastics, vol. 32, No. 4, pp. 283-301, (Oct. 2000).
G. Li, Y. Li, J.B. Metcalf, and S.S. Pang. Elastic Modulus Prediction of Asphalt Concrete. ASCE Journal of Materials in Civil Engineering, vol. 11, No. 3, pp. 236-241, (Aug. 1999).

* cited by examiner

*Primary Examiner* — Hui H Chin
(74) *Attorney, Agent, or Firm* — John H. Runnels

(57) ABSTRACT

The low temperature cracking and high temperature rutting of polymer-modified asphalt concrete pavement can be reduced. The composite includes asphalt and at least one polymer that expands at low temperature, triggered by cooling-induced tensile stress, to reduce thermal cracking. The composite includes at least one polymer that expands at high temperature, so that the composite recovers after compression induced by traffic loading at higher temperatures, thereby reducing rutting. The system reduces thermal stress, and reduces or even eliminates thermal cracking and rutting. Shape memory polymers (SMPs) are used to improve asphalt compositions so that they better resist both thermal cracking and rutting. The SMP(s) can be incorporated into the asphalt, or a portion of fine aggregates can be replaced with SMP particles or SMP fibers, or aggregate replacement and asphalt modification can be combined.

12 Claims, 2 Drawing Sheets

SMART RUTTING AND CRACKING RESISTANT ASPHALT PAVEMENT INCORPORATING SHAPE MEMORY POLYMERS

The benefit of the filing date of provisional application 62/642,108, filed Mar. 13, 2018 is claimed under 35 U.S.C. § 119(e). The complete disclosures of the priority application is hereby incorporated by reference in its entirety.

TECHNICAL FIELD

This application pertains to compositions and methods for enhancing the resistance of asphalt concrete to permanent deformation, to cracking, or to both.

BACKGROUND

Cracking is one of the three major "distresses" of asphalt pavement: cracking, fatigue, and rutting. Cracking has been a topic of intense research for many years. One of the main challenges facing the transportation community is asphalt pavement cracking, particularly at low temperatures—including transverse cracking, reflective cracking, block cracking, and alligator cracking. Cracked pavement provides pathways for water and debris to penetrate into the asphalt layer and the layers beneath. Cracked pavement can effectively "funnel" traffic into a smaller area of pavement, which can lead to premature failure of the pavement, loss of riding comfort, increased driving time, and increased costs. Although humans have landed on the Moon and humans may even travel to the Mars in the near future, we still have not solved the problems of rutting and cracking underfoot. A principal difficulty lies in the conflicting requirements for addressing the two types of defects: rutting resistance requires an elastic, stiffer binder, while cracking resistance needs a plastic, softer binder. Unfortunately, asphalt, as a thermally susceptible material, softens at higher temperatures, which is conducive to development of ruts, and it hardens at lower temperatures, which permits crack development.

Low temperature cracking in asphalt pavement is primarily due to the large coefficient of thermal expansion of asphalt, which is on the order of $10^{-4}/°$ C., and to the thermal susceptibility of asphalt, viz. asphalt becomes a brittle, elastic solid at low temperatures, while it is viscoelastic, viscoplastic, or even liquid at high temperatures. As the temperature drops a high degree of contraction, coupled with an increase in stiffness and a reduction in deformability, allows tensile stress to easily accumulate to a level that exceeds the tensile strength of asphalt or asphalt mixture, leading to low-temperature cracking. Cracking does not necessarily need a low temperature, however. Sometimes, although the temperature is not that low, i.e., even when the asphalt still possesses viscoelasticity, a sudden temperature drop—such as from a thunderstorm or hail on a hot summer afternoon—can create a large thermal gradient and thermal stress in asphalt pavement. The thermal stress cannot be fully relaxed due to the short duration of the event, leading to cracking even at higher temperatures. Thus thermal cracking can occur year-round.

Many efforts have been made to solve these problems. For example, softer asphalt has lower stiffness and thus lower thermal stress in the winter, leading to less cracking. However, softer asphalt is also more susceptible to high-temperature rutting, another type of distress that affects riding comfort and service lifetime.

Another way to improve thermal cracking resistance is to use a polymer-modified asphalt. Incorporation of polymers into asphalt can increase the stiffness at high temperature and reduce the stiffness at low temperature, i.e., reduce the thermal susceptibility. Polymers can also increase the tensile strength of a modified asphalt. Consequently, both thermal cracking and rutting problems can be ameliorated. Polymer-modified asphalts have been widely used for heavy-duty pavement applications. Many types of polymers have been used in modifying asphalt, including for example rubbers, elastomers, thermoplastic polymers, and crumb rubbers. Most of these polymers, when mixed with asphalt, go into a dispersed phase, forming a two-phase polymer-modified composite. When the polymer content is sufficiently high, a phase inversion can occur; i.e., the asphalt becomes the dispersed phase and the polymer becomes the continuous phase. Uncured resins and cross linkers can also be mixed into asphalt, for example with a compounder or an extrusion machine, and then when the resin is cured within the asphalt matrix, an interpenetrating network can form and strengthen the polymer-modified asphalt. For two-phase composites, the thermomechanical properties can be estimated by a rule-of-mixture approach. Because some polymers are more effective in improving high temperature performance, while others are more efficient in enhancing low temperature properties, more than one type of polymer can be used in modifying a particular asphalt mixture.

While approaches such as these have achieved partial success, problems still remain. The polymers typically have thermal behavior similar to that of asphalt, i.e., they expand when the temperature rises, and they contract when the temperature drops. Incorporating polymers into the asphalt widens its viscoelastic range, i.e., so that it does not behave as a liquid in the summer, nor as a brittle solid in the winter. However, the polymer-modified asphalt still contracts when the temperature drops. Thus conventional approaches to using polymers have not solved the root cause of the problem.

Besides cracking, another problem for asphalt pavements is rutting at locations such as traffic intersections, stop signs, or channelized heavy-duty roads. Rutting is a typical defect in asphalt concrete pavement due to the inherent plastic deformation of asphalt at high temperatures, particularly with channelized traffic, and at stop signs and other locations where frequent acceleration/deceleration occurs. Rutting damage not only reduces riding comfort and shortens pavement service life, but it can also cause accidents. Rutting might be reduced in asphalt concrete if one could eliminate plastic deformation, or recover from plastic deformation. Various approaches have been investigated such as using a rubber-modified asphalt as a binder. Although the enhanced elasticity helps reduce or delay rutting, over the years plastic deformation still develops due to the channelized traffic load, and permanent deformation gradually accumulates. There is an unfilled need for improved methods and compositions capable of recovering plastic deformation in asphalt; and for the ability to recover from plastic deformation in asphalt concrete.

Although cracking predominates in some asphalt pavements, while rutting predominates in others, it is common to see both types of distress in the same asphalt pavement. One reason is the conflicting approaches to overcoming the two types of defect: reduced rutting favors an elastic, stiffer binder, while reduced cracking favors a plastic, softer binder. Unfortunately, asphalt, a thermally susceptible material, softens at higher temperatures, which is conducive to rutting development, and it hardens at lower temperatures, which allows crack development. Various approaches have been tried to address these problems, such as using rubber-modified asphalt, or changing aggregate size and gradation. Because rubber adds elasticity and high temperature stiffness to the pavement, rutting can be significantly reduced. For cracking resistance, a softer binder can be effective. However, a softer binder sacrifices rutting resistance, and cracks tend to widen over time. Cracking is an even more difficult problem to address because asphalt, including rubber-modified asphalt, has a coefficient of thermal expansion an order higher than that of typical aggregate fillers, leading to low-temperature cracking, and sometimes even to high-temperature cracking. There is an unfilled need for improved asphalt compositions that can resist both thermal cracking and rutting.

T. Chung, A. Romo-Uribe, P. T. Mather. Two-way reversible shape memory in a semicrystalline network. Macromolecules, Vol. 41, pp. 184-192, (2008) disclosed studies on a two-way shape memory effect in cross-linked poly(cyclooctene). Crystallization-induced elongation was reported upon cooling, and melting-induced shrinkage on heating. The effects of the degree of cross-linking were also examined.

P. Zhang and G. Li. Structural Relaxation Behavior of Strain Hardened Shape Memory Polymer Fibers for Self-Healing Applications. Journal of Polymer Science Part B: Polymer Physics, Vol. 51, No. 12, pp. 966-977, (2013) describes a study of certain properties of shape-memory polyurethane fibers. Structural relaxation was related to stress relaxation by an analysis of conformational entropy.

S. Hu, F. Zhou, and T. Scullion. Development, calibration, and validation of a new M-E rutting model for HMA overlay design and analysis. ASCE Journal of Materials in Civil Engineering, Vol. 23, pp. 89-99, (2011) presents models for the occurrence of rutting in asphalt.

B. Huang, G. Li, and L. N. Mohammad. Analytical Modeling and Experimental Study of Tensile Strength of Asphalt Concrete Composite at Low Temperatures. Composites Part B: Engineering, Vol. 34, No. 8, pp. 705-714, (December, 2003) presents models and experimental data for the tensile strength of asphalt at low temperatures, treating hot-mix asphalt mixtures as two-phase composite materials with aggregates dispersed in an asphalt matrix. See also: G. Li, Y. Zhao, and S. S. Pang. Micromechanical Modeling of Polymer Modified Asphalt at Low Temperatures. Journal of Elastomers and Plastics, Vol. 32, No. 4, pp. 283-301, (October, 2000); and G. Li, Y. Li, J. B. Metcalf, and S. S. Pang. Elastic Modulus Prediction of Asphalt Concrete. ASCE Journal of Materials in Civil Engineering, Vol. 11, No. 3, pp. 236-241, (August, 1999).

SUMMARY OF THE INVENTION

I have discovered a way to incorporate one or more polymers into asphalts in a way that ameliorates low-temperature cracking and high-temperature rutting simultaneously. Asphalt is mixed with one or more shape memory polymers, at least one or which expands upon cooling (for instance below 0° C.), and at least one of which expands upon heating (for instance above 0° C.). Thermal stress is greatly reduced, and cracking and rutting are reduced or even eliminated.

Shape memory polymers (SMPs) are used to improve asphalt compositions so that they better resist both thermal cracking and rutting. The SMP can be incorporated into the asphalt, or a portion of fine aggregates can be replaced with SMP particles or SMP fibers, or aggregate replacement and asphalt modification can be combined. An alternative embodiment uses a standalone SMP component within an asphalt pavement, for example the form of a pre-stretched SMP grid, or a pre-stretched SMP stress-absorbing membrane, or an SMP-modified asphalt tack coat, etc., to reduce cracking and to provide reinforcement.

Preferred Characteristics for the SMP at High Temperatures.

At high temperatures, the invention inhibits rutting or permanent deformation. A one way shape memory polymer (1W-SMP) is well-suited for this purpose. Because 1W-SMP can recover the original shape after plastic deformation, incorporation of 1W-SMP into asphalt concrete can reduce or eliminate rutting. For example, 1W-SMP can be machined into particles or fibers, such as in the range of fine aggregates. A portion of fine aggregates can then be replaced with 1W-SMP particles. In a hot mix asphalt (HMA), compaction during construction at high temperature completes classical 3-D compression programming of the 1W-SMP particles, so long as the 1W-SMP particles have a decomposition or burning temperature higher than the mixing temperature of HMA, which is usually below 200° C. Thus programming of the SMPs is effectively coupled with construction, and no separate programming step is then required. If the transition temperature of the SMP particles is chosen to coincide with typical summer temperatures the pavement will experience, the summer temperature will trigger the shape recovery (volume expansion) of the programmed SMP particles, which helps restore the original shape of the pavement and thus helps minimize or even eliminate rutting. Also, traffic loading provides compression programming to the SMP particles, particularly in summer, thus rendering repeatable the ability to eliminate rutting. A 1W-SMP modified asphalt acts similarly to a binder.

Preferred Characteristics for the SMP at Low Temperatures (or at High Temperatures, with a Sudden Temperature Drop).

At low temperatures, embodiments of the invention inhibit cracking. A two-way shape memory polymer (2W-SMP) is well-suited for this purpose, either as fine particles or fibers to replace fine aggregates, or as a 2W-SMP modified asphalt binder. A 2W-SMP expands upon cooling. When the temperature drops, the small thermal stress produced in pavement triggers the expansion of the polymer if the 2W-SMP has a quasi two-way shape memory effect (2W-SME), i.e., a tensile stress can trigger the 2W-SME. Or if the 2W-SMP has a true 2W-SME, i.e., if no tensile stress is needed to trigger 2W-SME, or if an advanced 2W-SME is used, i.e., if the polymer expands even under compressive stress, then a temperature drop alone can suffice to trigger expansion. A low-temperature expansion counterbalances the natural thermal contraction of the asphalt pavement and reduces the accumulation of tensile stress, eliminating the root cause of most asphalt cracking. This effect applies to both a 2W-SMP modified asphalt and to an asphalt in which fine aggregates are wholly or partially replaced by 2W-SMP particles or fibers.

To address both the rutting problem and the cracking problem simultaneously, the asphalt pavement should have the ability to recover from compressive deformation from traffic loads at high temperature; while at the same time the asphalt pavement should have the ability to expand under tensile thermal stress at low temperature. In other words, the asphalt pavement should expand at high temperature under compressive load; and it should also expand at low temperature under tensile load. In preferred embodiments, no prior, separate programming step is needed to trigger the shape memory effect. Repeated traffic loads provide compression programming at high temperature; and natural cooling provides the tensile stress needed to trigger expansion upon temperature drops. Therefore, conventional road construction or other construction approaches may otherwise be used when SMP is incorporated into asphalt pavement in accordance with the present invention.

BRIEF DESCRIPTION OF THE DRAWINGS

FIG. 1A shows the original shape of the 1W-SMP particles in the asphalt concrete matrix. FIG. 1B shows the SMP particles under traffic load. Under compression loading or compression programming, the SMP particle size is reduced. FIG. 1C shows that after removal of the traffic load, the SMP particle experiences springback and shape recovery, restores to its original shape, and removes or reduces permanent deformation or rutting.

FIG. 2A shows the original shape of the 2W-SMP particles in the asphalt concrete matrix. FIG. 2B shows thermal tensile stress, induced by natural cooling, triggering the expansion of 2W-SMP particles within the asphalt matrix. FIG. 2C shows thermal stress reducing as the temperature rises. The 2W-SMP particle shrinks due to springback, and restores to its original shape due to shape memory effect, thus inhibiting cracking.

MODES FOR PRACTICING THE INVENTION

Figure 1C:
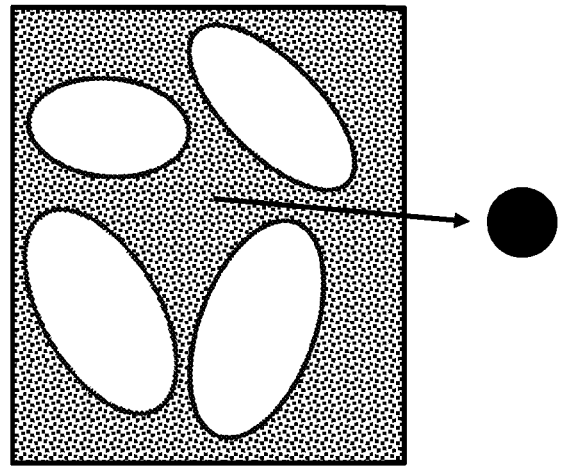
FIGS. 1A, 1B, and 1C depict schematically the behavior of an asphalt composite in accordance with the present invention, with a 1W-SMP.
Figure 1B:
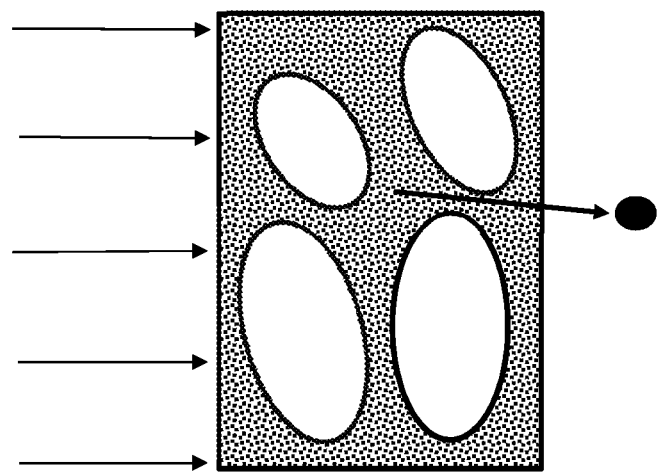
Figure 1A:
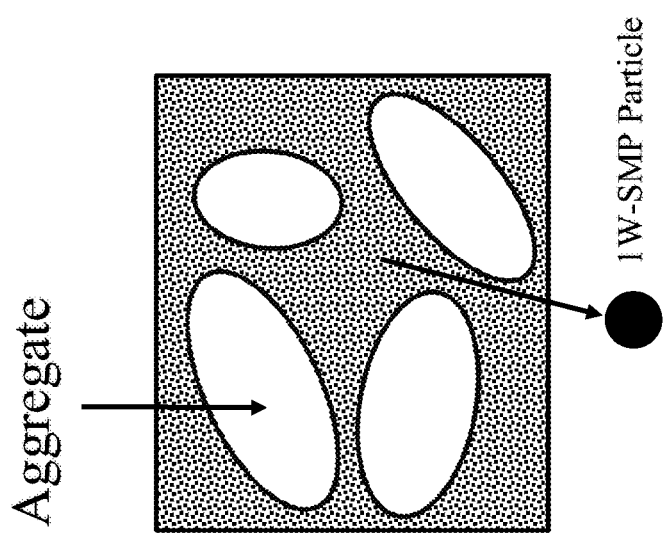
Figures 2A, 2B, 2C:
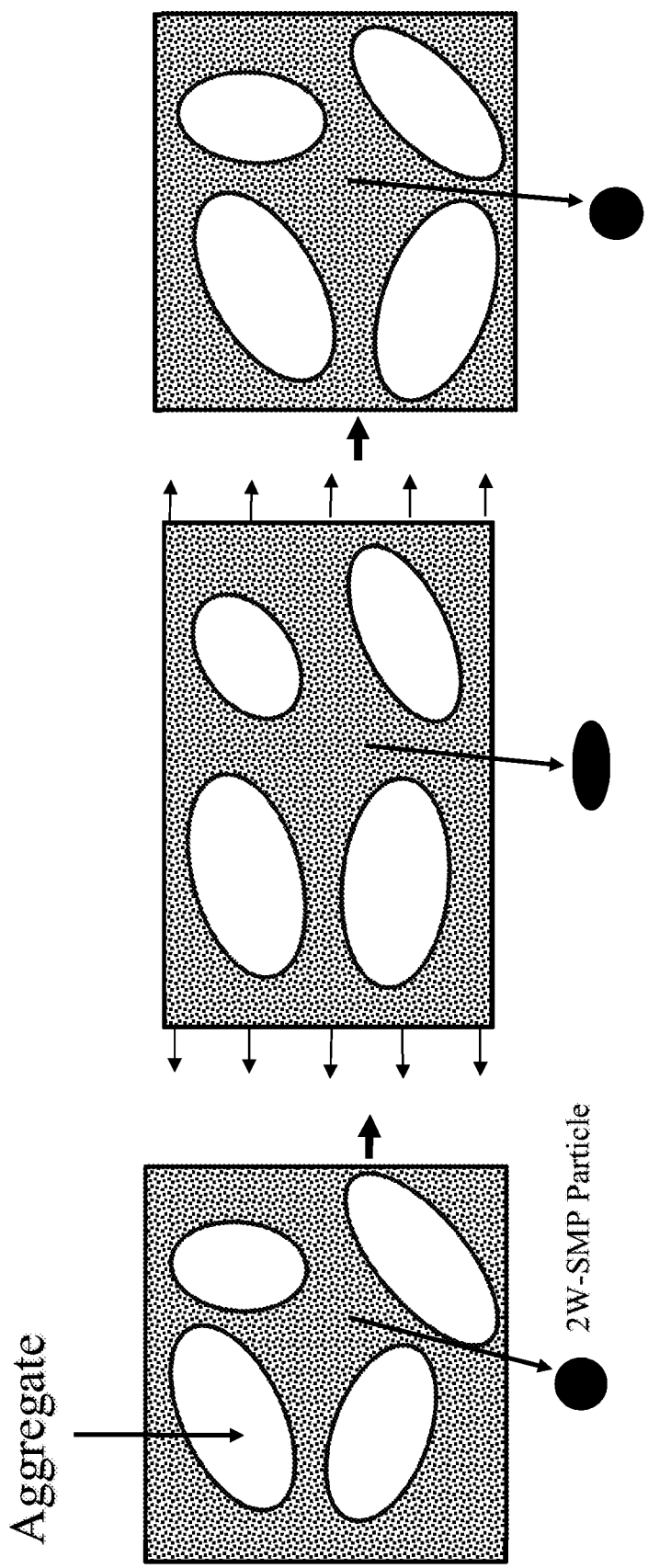
FIGS. 2A, 2B, and 2C depict schematically the behavior of an asphalt composite in accordance with the present invention, with a 2W-SMP.

Embodiments of the invention include two SMP systems, and four manners of incorporating the SMPs, in order to solve rutting and cracking problems in asphalt pavement:

A One-SMP System.

A two-way shape memory polymer is used that exhibits 1W-SME (expansion) under compression programming at high temperature, and 2W-SME (expansion) triggered by tensile stress at low temperature. Various chemically cross-linked semi-crystalline shape memory polymers exhibit this combination of 2W-SME at low temperature and 1W-SME at high temperature, for example: polybutadiene with 98% cis content, poly(ethylene-co-vinyl acetate), ionomer, polyurethane, polyethylene, polycaprolactone, or polycyclooctene. The polymer should have very high entropy (a large number of configurations) at high temperatures, and high crystallinity at low temperatures. Polymers with C=C double bonds in the molecule backbone favor the formation of more configurations, i.e., a higher entropy:

$$S = k_B \ln W$$

where S the configurational entropy, $k_B$ is the Boltzmann constant and W is the number of possible configurations.

The high temperature experienced by the asphalt pavement varies based on the geographical region and local climate, and is usually below 70° C. The low temperature experienced by the asphalt pavement also varies based on the geographical region and local climate, and is usually above −40° C. The entropy reduction during programming depends on the pre-strain level, programming temperature, and springback after load removal. The crystallinity depends on the composition, molecular structure, external load, and temperature. Usually, for 2W-SMPs, it is preferred that crystallinity should be above 50% at temperatures below the crystallization temperature.

When temperature drops, polymer entropy can be reduced by mechanical deformation or programming. The aligned molecule chains or segments can form mesogen-like morphologies, which helps lock the temporary shape. When temperature rises, the locked shape returns to the original shape, i.e., 1W-SME. Further cooling will cause the mesogen to crystallize. Under tensile stress, the crystallization will cause extension in the loading direction when the temperature drops, i.e., 2W-SME.

In summary, we use the unique SME of semi-crystalline 2W-SMP materials at different temperatures: At high temperature, there is 1W-SME due to rubber-like elastic behavior (similar to that of a conventional amorphous SMP). At low temperature, there is 2W-SME due do the melting/crystallization transition. Thus the 2W-SMP expands at both low and high temperatures: At high temperature, the 2W-SMP is compression-programmed by the traffic load, and thus it can recover to its original shape (expansion) due from the 1W-SME, reducing the amount of rutting problem; while at low temperature, natural cooling in the pavement applies a tensile stress to the 2W-SMP, which leads to expansion from the 2W-SME (melting/crystallization transition), reducing the amount of cracking.

A Two-SMP System.

This embodiment uses a combination of two SMPs. The first polymer is a 1W-SMP that imparts rutting resistance. The second polymer is a 2W-SMP that imparts cracking resistance. Various chemically cross-linked thermosets such as epoxies, polystyrenes, and thermoset polyurethanes have shown superior 1W-SME with a transition temperature matching that of pavement in the summer; for example: (a) an epoxy resin such as diglycidyl ether of bisphenol A, 1,3-bis (aminomethyl)cyclohexane, and bisphenol A glycerolate dimethacrylate, cross-linked with a cross-linker such as a diamine, polycarboxylic acid, phthalic anhydride, tricarballylic acid, or a rigid isophorone diamine; (b) a polyurethane, the reaction product of a di- or polyisocyanate with a polyol, a polyimide, poly-phenylmaleimide, or poly-tris (4-aminophenyl)amine; or (c) a polystyrene, the reaction product of polystyrene with butyl acrylate, vinyl neodecanoate, or soybean oil. At the same time, many thermoplastics such as polyurethane, polyethylene terephthalate, polyethyleneoxide, polynorbonene, polyether ether ketone, and polyvinyl acetate have also exhibited excellent 1W-SME, again, with the transition temperature matching that of pavement temperature in the summer. Similarly, many polymers, including polybutadiene, ionomers, polyurethane, polyethylene, polycaprolactone, and polycyclooctene have shown excellent 2W-SME, including some at temperatures below 0° C. One can use the 1W-SMP and the 2W-SMP polymers in combination to address both rutting and cracking. The 1W-SMP is responsible for high temperature expansion, and the 2W-SMP for low temperature expansion.

Manner of Incorporating the SMPs.

Either the one-SMP system or the two-SMP system can be incorporated into the asphalt mixture in any one of at least four different ways: (1) asphalt modification, (2) aggregate replacement, (3) geogrid reinforcement, or (4) a combination of any two or three of the foregoing. Based on the functionality of the particular SMPs and their effectiveness in alleviating cracking and rutting, for a two-SMP system a preferred choice would be to use a 2W-SMP to modify asphalt to resist cracking, and a 1W-SMP to replace a portion of fine aggregates, to resist rutting; while for a one-SMP system, a preferred choice would be to use one portion of a 2W-SMP to replace some or all of the fine aggregates, and another portion of the 2W-SMP to modify the asphalt. To resist reflective cracking, i.e., cracking that starts from the base, such as a cement-treated soil, an underlying older cement concrete pavement, etc., and propagates upward into the asphalt concrete surface layer, a pre-stretched 1W-SMP geogrid can be placed at the bottom of the asphalt layer. The geogrid layer not only provides some reinforcement to the asphalt layer, but it also helps close reflective cracks due to its contraction as the shape recovers. Because the traffic load produces tensile stress at the bottom of the asphalt concrete surface layer (flexural tensile stress), and thus upon the geogrid layer, the SMP geogrid will undergo repeated tensile programming, and thus its ability to close reflective cracks is repeatable.

Incorporation of polymers into asphalt pavement also improves the fatigue resistance of pavement. Therefore, this invention, while focusing on alleviating cracking and rutting distresses, can also help reduce the third major distress in asphalt pavement—fatigue fracture.

Miscellaneous

The preferred temperature range for asphalt concrete composites in accordance with the present invention depends, in part, on local climate and expected temperature extremes. In some embodiments, the temperature range comprises at least the range −30° C. to +50° C. In other embodiments, the low end of the temperature range can be −50° C., −49° C., −48° C., −47° C., −46° C., −45° C., −44° C., −43° C., −42° C., −41° C., −40° C., −39° C., −38° C., −37° C., −36° C., −35° C., −34° C., −33° C., −32° C., −31° C., −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., or 0° C. In other embodiments, the high end of the temperature range can be 70° C., 69° C., 68° C., 67° C., 66° C., 65° C., 64° C., 63° C., 62° C., 61° C., 60° C., 59° C., 58° C., 57° C., 56° C., 55° C., 54° C., 53° C., 52° C., 51° C., 50° C., 49° C., 48° C., 47° C., 46° C., 45° C., 44° C., 43° C., 42° C., 41° C., 40° C., 39° C., 38° C., 37° C., 36° C., 35° C., 34° C., 33° C., 32° C., 31° C., or 30° C.

Some embodiments of the invention include composites comprising a cured or uncured admixture of shape memory polymer and asphalt. In some embodiments, the admixture has been cured; in other embodiments the admixture is supplied uncured, and it may then be cured when desired. In some embodiments the shape memory polymer comprises between 20% and 90% of the composite by mass. In other embodiments, the percentage of polymer can be 5%, 10%, 15%, 20%, 25%, 30%, 35%, 40%, 45%, 50%, 55%, 60%, 65%, 70%, 75%, 80%, 85%, 86%, 87%, 88%, 89%, 90%, 91%, 92%, 93%, 94%, 95%, 96%, 97%, 98%, 99%, or 100%. In some embodiments asphalt comprises between 10% and 80% of said composite by mass. In other embodiments, the percentage of asphalt can be 0%, 1%, 2%, 3%, 4%, 5%, 6%, 7%, 8%, 9%, 10%, 11%, 12%, 13%, 14%, 15%, 20%, 25%, 30%, 35%, 40%, 45%, 50%, 55%, 60%, 65%, 70%, 75%, 80%, 85%, or 90%.

As used in the specification and claims, "permanent" deformation has the meaning that it normally has in the art in this context. Strain is a change in the dimension or size of an object as it is stressed by an external force, such as when a motor vehicle drives over an asphalt pavement. The elastic or resilient component of the strain is the extent to which the object recovers when the external force is removed, and the plastic or "permanent" deformation is the extent to which the change in the object's dimension does not recover when the external force is removed. Put differently: After a load is removed, the residual deformation that does not recover is called "permanent" deformation.

Various embodiments of the invention include, for example, one or more of the following components or properties: (1) At least one shape memory polymer exhibits a one-way shape memory effect over at least a portion of the temperature range +20° C. to +70° C., wherein the one-way shape-memory effect is repeatable over multiple cycles of heating and cooling, and over multiple cycles of weight-bearing loading. (2) At least one shape memory polymer exhibits a two-way shape memory effect over at least a portion of the temperature range −50° C. to 0° C., wherein the two-way shape memory effect is repeatable over multiple cycles of heating and cooling, and over multiple cycles of weight-bearing loading. (3) The one-way shape memory effect reduces permanent deformation of an asphalt concrete, over at least a portion of the temperature range +20° C. to +70° C., as compared to an otherwise-identical composite lacking shape memory polymers. (4) The two-way shape memory effect reduces cracking of an asphalt concrete, over at least a portion of the temperature range −50° C. to 0° C., as compared to an otherwise-identical composite lacking shape memory polymers. (5) Shape memory polymers are integrally mixed into the asphalt; or are integrated into the aggregate, as particles having overlapping size and shape with the size and shape of the particles of the aggregate; or comprise a geogrid that reinforces an asphalt concrete; or comprise a stress-absorbing membrane or tack coat layer. (6) At least one two-way shape memory polymer is selected from the group consisting of cross-linked polybutadiene, cross-linked polybutadiene with 98% or higher cis content, polyethylene, polycyclooctene, poly(ethylene-co-vinyl acetate), polyurethane, polycaprolactone, and an ionomer. (7) At least one shape memory polymers is a thermoset, one-way shape memory polymer selected from the group consisting of: (a) an epoxy resin selected from the group consisting of diglycidyl ether of bisphenol A, 1,3-bis (aminomethyl)cyclohexane, and bisphenol A glycerolate dimethacrylate, cross-linked with a cross-linker selected from the group consisting of diamine, polycarboxylic acid, phthalic anhydride, tricarballylic acid, and a rigid isophorone diamine; (b) a polyurethane, the reaction product of a di- or polyisocyanate with a polyol, a polyimide, poly-phenylmaleimide, poly-tris(4-aminophenyl)amine, etc.); (c) a polystyrene; and (d) the reaction product of polystyrene with butyl acrylate, vinyl neodecanoate, or soybean oil. (8) At least one shape memory polymer is a thermoplastic, one-way shape memory polymer selected from the group consisting of poly(ethylene-co-methacrylic acid), ethylene-methacrylic acid copolymer, polyether ether ketone, polypropylene, polystyrene, polyurethane, polynorbonene, polyester, polyether, polyethylene terephthalate, polyethyleneoxide, poly(1,4-butadiene), poly(vinyl acetate), polyimide-6 (nylon-6), poly(tetrahydrofuran), poly(2-methyl-2-oxazoline), poly(ethylene adipate), 1,1'-methylene-bis(4-isocyanatobenzene)/1,4-butanediol, poly(ε-caprolactone), poly vinyl chloride, polyethylene/polyamide blend, or combinations thereof. (9) At least one shape memory polymer has a decomposition temperature 200° C. or higher, 250° C. or higher, or 300° C. or higher. (10) At least one shape memory polymer exhibiting a two-way shape memory effect expands 5% or more when the temperature drops from 0° C. to −60° C., or 10% or more, 20% or more, 50% or more, or 100% or more. (11) At least one shape memory polymer exhibiting a one-way shape memory effect expands 2% or more when the temperature rises from 0° C. to 60° C., or 5% or more, 10% or more, 20% or more, 30% or more, 40% or more, or 50% or more. (12) The shape memory polymer particles are coated with a 1-10 µm layer of mineral filler to inhibit aggregation of said particles or fibers to one another or to other components of the asphalt concrete. Examples of suitable mineral fillers include limestone powder, or cement powder. (13) The shape memory polymer consists essentially of particles or fibers having a maximum dimension of 10 mm or less, 5 mm or less, 2 mm or less, 1 mm or less, 0.5 mm or less, 0.1 mm or less, 0.05 mm or less, 0.02 mm or less, or 0.01 mm or less. (14) The shape memory polymer comprises between 1% and 20% of the total asphalt concrete by mass. Alternatively, the shape memory polymer may comprise by mass 20% or less, 15% or less, 10% or less, 5% or less, 4% or less, 3% or less, 2% or less, 1% or less, 0.5% or less, or 0.1% or less. (15) The asphalt concrete is the product of dispersing one or more cured shape memory polymers into an asphalt matrix. (16) The asphalt concrete is the product of mixing asphalt with one or more uncured shape memory polymers and a crosslinker with a compounder or with an extrusion machine, followed by curing. Examples of suitable crosslinkers include polycaprolactone cured with benzoyl peroxide, and poly(ethylene-co-vinyl acetate) cured with dicumyl peroxide. (17) Except for the addition of shape memory polymer(s) as described herein, the asphalt and aggregate components of the composites may be any asphalt or aggregate otherwise known in the art.

The disclosure of U.S. provisional patent application Ser. No. 62/642,108, filed Mar. 13, 2018 is hereby incorporated by reference in its entirety. The complete disclosures of all references cited herein are hereby incorporated by reference in their entirety. Also incorporated by reference is the complete disclosure of the following publication: L. Lu et al., "Giant reversible elongation upon cooling and contraction upon heating for a crosslinked cis poly(1,4-butadiene) system at temperatures below zero Celsius," *Scientific Reports* (2018) 8:14233, including its published Supplementary Information. In the event of an otherwise irreconcilable conflict, the present specification shall control over any material incorporated by reference.

What is claimed:

1. An asphalt concrete resistant both to permanent deformation and to cracking; said asphalt concrete comprising a composite of asphalt, aggregate, and one or more shape memory polymers; wherein:
   (a) at least one of said one or more shape memory polymers exhibits a one-way shape memory effect over at least a portion of the temperature range +20° C. to +70° C., wherein the one-way shape-memory effect is repeatable over multiple cycles of heating and cooling, and over multiple cycles of weight-bearing loading;
   (b) at least one of said one or more shape memory polymers is selected from the group consisting of cross-linked polybutadiene, cross-linked polybutadiene with 98% or higher cis content, cross-linked polycyclooctene, cross-linked poly(ethylene-co-vinyl acetate), an ionomer, and combinations thereof; and exhibits a two-way shape memory effect over at least a portion of the temperature range −50° C. to 0° C., wherein the two-way shape memory effect is repeatable over multiple cycles of heating and cooling, and over multiple cycles of weight-bearing loading;
   (c) the one-way shape memory effect reduces permanent deformation of the asphalt concrete, over at least a portion of the temperature range +20° C. to +70° C., as compared to an otherwise-identical composite lacking said one or more shape memory polymers; and
   (d) the two-way shape memory effect reduces cracking of the asphalt concrete, over at least a portion of the temperature range −50° C. to 0° C., as compared to an otherwise-identical composite lacking said one or more shape memory polymers.

2. The asphalt concrete of claim 1, wherein at least one of said one or more shape memory polymers: (a) is integrally mixed into said asphalt; or (b) is integrally mixed into said aggregate, as particles having overlapping size and shape with the size and shape of the particles of the aggregate; or (c) comprises a geogrid that reinforces the asphalt concrete; or (d) comprises a stress-absorbing membrane or tack coat layer; or (e) a combination of two or more of the above.

3. The asphalt concrete of claim 1, wherein at least one of said shape memory polymers is a thermoset, one-way shape memory polymer selected from the group consisting of (a) an epoxy resin selected from the group consisting of diglycidyl ether of bisphenol A, 1,3-bis (aminomethyl)cyclohexane and bisphenol A glycerolate dimethacrylate, cross-linked with a cross-linker selected from the group consisting of a diamine, a polycarboxylic acid, phthalic anhydride, tricarballylic acid, and a rigid isophorone diamine; (b) a polyurethane, the reaction product of a di- or polyisocyanate with a polyol, a polyimide, poly-phenylmaleimide, and poly-tris(4-aminophenyl)amine; and (c) polystyrene, the reaction product of polystyrene with butyl acrylate, vinyl neodecanoate, and soybean oil; and (d) combinations thereof.

4. The asphalt concrete of claim 1, wherein at least one of said shape memory polymers is a thermoplastic, one-way shape memory polymer selected from the group consisting of poly(ethylene-co-methacrylic acid), ethylene-methacrylic acid copolymer, polyether ether ketone, polypropylene, a polystyrene, a polyurethane, polynorbonene, a polyester, a polyether, polyethylene terephthalate, polyethyleneoxide, poly(1,4-butadiene), poly(vinyl acetate), polyamide-6 (nylon-6), poly(tetrahydrofuran), poly(2-methyl-2-oxazoline), poly(ethylene adipate), 1,1'-methylene-bis(4-isocyanatobenzene)/1,4-butanediol, poly(ε-caprolactone), polyvinyl chloride, polyethylene/polyamide blend, and combinations thereof.

5. The asphalt concrete of claim 1, wherein at least one of said one or more shape memory polymers has a decomposition temperature 200° C. or higher.

6. The asphalt concrete of claim 1, wherein at least one of said one or more shape memory polymers with a two-way shape memory effect expands 5% or more when the temperature drops from 0° C. to −60° C.

7. The asphalt concrete of claim 1, wherein at least one of said one or more shape memory polymers with a one-way shape memory effect expands 2% or more when the temperature rises from 0° C. to 60° C.

8. The asphalt concrete of claim 1, wherein said asphalt concrete is uncured, and wherein said one or more shape memory polymers comprise particles or fibers that are coated with a 1-10 µm layer of mineral filler to inhibit aggregation of said particles or fibers to one another or to other components of said asphalt concrete, prior to curing.

9. The asphalt concrete of claim 1, wherein said one or more shape memory polymers consist essentially of particles or fibers having a maximum dimension 10 mm or less.

10. The asphalt concrete of claim 1, wherein said one or more shape memory polymers comprise between 1% and 20% of said asphalt concrete by mass.

11. The asphalt concrete of claim 1, wherein said asphalt concrete is the product of dispersing one or more cured shape memory polymers into an asphalt matrix.

12. The asphalt concrete of claim 1, wherein said asphalt concrete is the product of mixing asphalt with one or more uncured shape memory polymers and a crosslinker, using a compounder or using an extrusion machine, followed by curing.

\* \* \* \* \*